Dec. 23, 1952 M. WERNLI 2,622,252

SCREW THREADING APPARATUS

Filed Dec. 18, 1946 2 SHEETS—SHEET 1

INVENTOR:
Max Wernli
by Sommers + Young
Attorneys

INVENTOR:
Max Wernli
by Sommers + Young
Attorneys

Patented Dec. 23, 1952 2,622,252

UNITED STATES PATENT OFFICE 2,622,252

SCREW THREADING APPARATUS

Max Wernli, Schaffhausen, Switzerland, assignor to Aktiengesellschaft der Eisen- und Stahlwerke vormals Georg Fischer, Schaffhausen, Switzerland Application December 18, 1946, Serial No. 717,056
In Switzerland January 25, 1946

2 Claims. (Cl. 10—105)

My present invention relates to improvements in manually operated screw-threading apparatus comprising a rotary and axially displaceable die-head, on the spindle of which an externally threaded sleeve is detachably secured, which latter is engaged by a threading guide nut detachably secured to the casing of the apparatus. The objects of my improvements are first, to provide facilities permitting of adjusting the chasing speed to the nature of the material to be cut so as to enable the operator to perform the screw-threading operation on blanks of different material under a substantially uniform physical effort, and second to afford means for readily exchanging the master-thread assembly and for positively locating the latter without backlash or slack.

Figures 1, 2, 3:
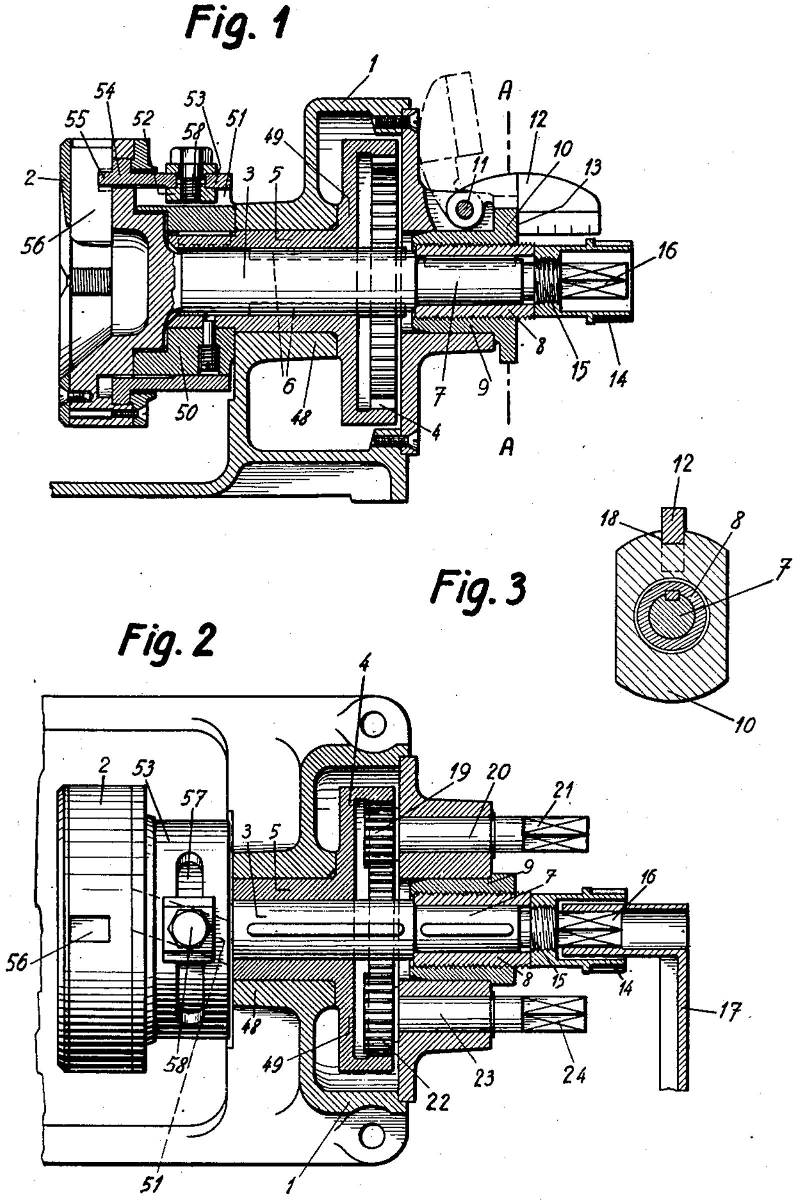
Figure 4:
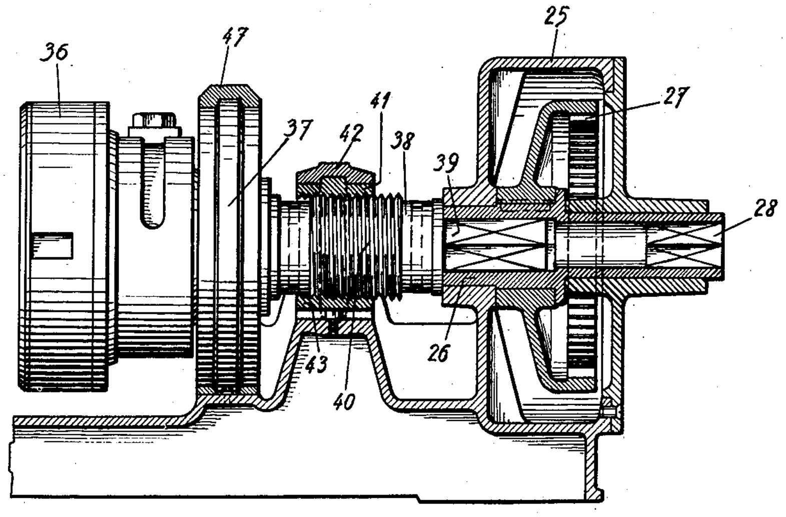
Figure 5:
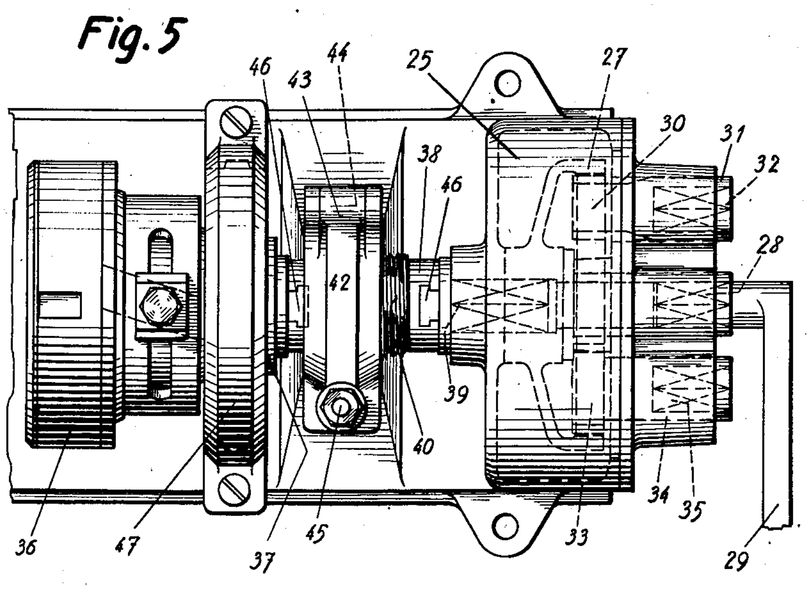

I attain these and related objects by the apparatus shown, in two forms of invention and by way of example, in the accompanying drawing, in which Fig. 1 shows a first form in vertical section, Fig. 2 a top plan view thereof, partly in horizontal section, Fig. 3 a cross-section on line A—A of Fig. 1, Fig. 4 a second form in elevation, partly in vertical section, and Fig. 5 a top plan view thereof.

In Figs. 1 and 2, 1 denotes the casing of the apparatus, 2 the die-head, 3 the spindle of the latter which is fastly secured to head 2, 4 an internal gear, and 5 is the hub of the latter, which faces head 2. Hub 5 is mounted rotatably in an axial bore of the hub portion 48 of casing 1 and non-rotatably, but in a sliding fit on keys 6 sunk into spindle 3 and being engaged in grooves of hub 5; such arrangement permitting of the necessary axial displacement of spindle 3 in hub 5 of gear wheel 4. The web disc 49, interconnecting internal gear 4 and hub 5, is abutting against hub portion 48 of casing 1. A ring 50, keyed to hub 5 of internal gear 4, abuts on one side against hub portion 48 of casing 1 and is provided with a helical groove 51 on its outside face, a slide block 52 being engaged therein. A clamping screw 58, screwed into the slide block 52, extends through a circumferential slot 57 provided in a hub portion 53 of an annular cam disc 54 which surrounds the ring 50. When the screw 58 is tightened the cam disc 54 is rigidly connected to the ring 50, and accordingly the ring 50 and the die head 2 rotate together with the cam disc 54. The latter is provided with ledges 55, projecting from the head face thereof and curved in plan, which are engaged in grooves of the chasers 56. The latter are guided, radially displaceable, in splines of head 2. When the clamping screw 58 is loosened, the cam disc 54, owing to the circumferential groove 57, can effect a limited movement of rotation with respect to the ring 50, and since the slide block 52 is engaged in the helical groove 51 of the ring 50, an axial displacement of the die-head and spindle 3 will result in a slight angular displacement of the cam disc relatively to the die-head and in a corresponding radial adjustment of the dies. Hub 5 also could be made integral with ring 50, and wheel 4 be mounted thereon. It also is possible to make ring 50, hub 5 and wheel 4 of one piece, in which case casing 1 comprises two detachable and disconnectible half rings so as to permit of mounting the one-piece part described. An exchangeable and externally threaded sleeve 8 is mounted on portion 7 of spindle 3 projecting to the rear from wheel 4 and secured thereon. A cylindrical screw nut 9, provided with threads identical to those of sleeve 8, is screwed onto the latter and supported in a cylindrical bore of casing 1. A terminal rear flange 10 is abutting against the rear face of casing 1 when the apparatus is in operation. A pawl 12 is fulcrumed at 11 on casing 1, and its nib or lug 13 abuts against the rear face of flange 10 of nut 9 so as to axially lock the latter in casing 1. By replacing the master-screw assembly 8, 9 by one of different pitch, the blank worked on is provided with corresponding threads. Nut 9 in such arrangement not only serves as guide for sleeve 8, but also as bearing for portion 7 of spindle 3 of die-head 2. Sleeve 8 is axially secured by a nut 14 screwed onto a threaded portion 15 of portion 7. The end of the latter, adjacent to the threaded portion 15, is formed as a square head 16, and may be engaged in the square socket of the hub of a hand lever 17. Rotation of nut 9 relative to casing 1 is prevented by pawl 12 entering a groove 18 (Fig. 3) provided on flange 10 of nut 9. The master-screw assembly 8, 9 thus is firmly secured in casing 1, of the apparatus and only sleeve 8 may move axially together with spindle 3, 7, 15, 16 and die-head 2.

A pinion 19, keyed to the axle pin 20 which is journaled in casing 1, engages the internal gear 4. The free end of axle 20, projecting beyond casing 1, is formed as a square head 21 which may be engaged by hand lever 17. A pinion 22, being of greater diameter than pinion 19 and diametrically opposite thereto, also engages rim gear 4. Pinion 22 is keyed to axle pin 23 which is journaled in casing 1. The free end of axle 23, projecting beyond casing 1, is shaped as a square head and may be engaged by the socket hand lever 17. By such arrangement, spindle 3 and die-head 2 may either be rotated directly or by way of axle pins 20 or 23, in accordance with the nature of the blank material to be threaded by chasers 56, so as to require a substantially uniform physical effort from the part of the operator in case of different blank materials or diameters or types of threads.

When screw 58 is tightened fast to part 53, rotation of the spindle will cause it and the die head to move forward (left) as a result of the lead screw action. Forward movement of the die head carries with it cam member 53—54—55. This forward movement of 53—54—55 causes part 52 to react with slot 51 thereby turning the cam member thus causing the chasers to withdraw at a rate proportional to the angle of slot 51 and the rate of feed produced by the lead screw.

In the form of invention shown in Figs. 4 and 5, 25 denotes the casing, in which the hollow hub 26 of internal gear 27 is mounted rotatably, coaxial to the central operating spindle of the screw-threading apparatus. The end of hub 26 of internal gear 27, facing the rear end of the apparatus, is provided with a square socket 28 in which the square-head boss of a crank handle 29 may be inserted. A pinion 30, the axle pin 31 of which, mounted rotatably in casing 25, is provided with a square socket 32, meshes with gear wheel 27. Socket 32 also may receive the square-head boss of crank handle 29. A second pinion 33, diametrically opposite to pinion 30 and of greater diameter than the latter, meshes with gear 27, and its axle pin 34, mounted rotatably in casing 25, is provided with a square socket 35 adapted to engage the square-head boss of crank handle 29.

The spindle of die-head 36 comprises three portions 37, 38 and 39. The front portion 37 carries the die-head 36, the center portion 38 carries the externally threaded sleeve 40 co-acting with the corresponding nut 41, and the rear portion 39 is adapted as square-head slidably guided in a corresponding square socket of hub 26 of gear wheel 27. Master-nut 41 is held fast in a chuck 42, 43 which is anchored in casing 25. The top portion 42 and the bottom portion 43 are hinged on a pin 44, and may be drawn together, for fixing master nut 41, by means of a clamping screw 45. The spindle portions 37 and 39, at their ends facing the center portion 38, are provided with T-heads 46 engaged in correspondingly adapted recesses provided on the faces of center portion 38. When chuck portion 42 is swung open, the spindle portion 38 comprising the master-nut assembly 40, 41 may be withdrawn upwardly from or be inserted downwardly between the other spindle portions 37 and 39. The T-heads 46 allow the three spindle portions 37—39 to rotate and move axially as unit. The front spindle portion 37 is mounted rotatably in a ring 47 which is secured to casing 25 of the screw-threading apparatus.

What I claim and desire to secure by Letters Patent is:

1. In a manually operated threading apparatus having a stationary casing, the combination with a rotatable die-head, of a rotatably mounted die-head spindle rigid with the die-head and axially movable in said casing, a lead screw on said spindle, a lead nut for said screw mounted in said casing, said lead screw being formed by an exteriorly threaded sleeve exchangeably engaged over the rear end portion of said spindle remote from the die-head for rotation with the spindle, means on said spindle for holding the lead screw against axial displacement thereon, said means including a threaded end portion of the spindle projecting axially beyond said lead nut and outside of said casing and a nut screwed thereon and abutting against the rear end of the lead screw, said lead nut having said lead screw threaded therethrough and being supported by and removably engaged in said casing, said lead nut forming a rear bearing for radially supporting the rear end portion of the spindle, and means provided on the rear end of the spindle for engagement with a manual spindle driving member, and interlocking means accessible from outside of the casing for locking the nut against rotation relative to the casing.

2. In a manually operated threading apparatus having a stationary casing, the combination with a rotatable die-head, of a rotatably mounted die-head spindle rigid with the die-head and axially movable in said casing, a lead screw on said spindle, a lead nut for said screw mounted in said casing, said lead screw being formed by an exteriorly threaded sleeve exchangeably engaged over the rear end portion of said spindle remote from the die-head for rotation with the spindle, means on said spindle for holding the lead screw against axial displacement thereon, said means including a threaded end portion of the spindle projecting axially beyond said lead nut and outside of said casing and a nut screwed thereon and abutting against the rear end of the lead screw, said lead nut having said lead screw threaded therethrough and being supported by and removably engaged in said casing, said lead nut forming a rear bearing for radially supporting the rear end portion of said spindle, means provided on the rear end of the spindle for engagement with a manual spindle driving member, and a locking pawl pivotally mounted on the casing and interlocking with the rear end of said lead nut for axially and rotatably locking the nut in the casing.

MAX WERNLI.

REFERENCES CITED

The following references are of record in the file of this patent:

UNITED STATES PATENTS

| Number | Name | Date |
|---|---|---|
| 153,770 | Heap | Aug. 4, 1874 |
| 270,409 | Forbes | Jan. 9, 1883 |
| 280,575 | Castle | July 3, 1883 |
| 948,102 | Walter | Feb. 1, 1910 |
| 1,053,482 | Dreier | Feb. 18, 1913 |
| 1,190,768 | Joslin | July 11, 1916 |
| 1,746,266 | Klausmeyer | Feb. 11, 1930 |
| 1,747,418 | Bishop | Feb. 18, 1930 |
| 1,969,854 | Pealer | Aug. 14, 1934 |
| 2,046,991 | Zeller | July 7, 1936 |

FOREIGN PATENTS

| Number | Country | Date |
|---|---|---|
| 571,140 | Great Britain | Aug. 8, 1945 |
| 17,434 | Great Britain | Sept. 18, 1895 |